(12) United States Patent
Saffre (10) Patent No.: US 9,031,082 B2
(45) Date of Patent: May 12, 2015

(54) ROUTING METHOD AND APPARATUS FOR COMMUNICATION IN DYNAMIC NETWORKS

(75) Inventor: Fabrice T P Saffre, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 2049 days.

(21) Appl. No.: 10/469,036

(22) PCT Filed: Mar. 15, 2002

(86) PCT No.: PCT/GB02/01268
§ 371 (c)(1),
(2), (4) Date: Aug. 26, 2003

(87) PCT Pub. No.: WO02/076037
PCT Pub. Date: Sep. 26, 2002

(65) Prior Publication Data
US 2004/0071124 A1     Apr. 15, 2004

(30) Foreign Application Priority Data

Mar. 21, 2001 (EP) .................................. 01302655

(51) Int. Cl.
*H04L 12/28* (2006.01)
*H04L 12/721* (2013.01)
*H04L 12/751* (2013.01)
*H04W 40/02* (2009.01)
*H04W 40/28* (2009.01)
*H04W 88/14* (2009.01)

(52) U.S. Cl.
CPC ................ *H04L 45/44* (2013.01); *H04L 45/08* (2013.01); *H04L 45/566* (2013.01); *H04W 40/02* (2013.01); *H04W 40/28* (2013.01); *H04W 88/14* (2013.01)

(58) Field of Classification Search
USPC .............. 370/389, 390, 395.2, 395.21, 395.3, 370/395.31, 395.32
See application file for complete search history.

(56) References Cited

U.S. PATENT DOCUMENTS

| | | | | |
|---|---|---|---|---|
| 6,542,934 B1 * | 4/2003 | Bader et al. | .................... | 709/239 |
| 6,628,617 B1 * | 9/2003 | Karol et al. | .................... | 370/237 |
| 6,954,790 B2 * | 10/2005 | Forslow | ........................ | 709/227 |
| 2002/0069278 A1 * | 6/2002 | Forslow | ........................ | 709/225 |
| 2007/0050493 A1 * | 3/2007 | Sienel et al. | .................. | 709/223 |

OTHER PUBLICATIONS

Ko et al.; Locaton-Aided Routing (LAR) in mobile ad hoc networks; 2000; Wirless Networks 6; J.C. Baltzer AG, Science Publishers; pp. 307-321.*

Choudhury et al, "A Distributed Mechanism for Topology in Ad Hoc Wireless Networks Using Mobile Agents", Proceedings of First Annual Workshop on Mobile and Ad Hoc Networking and Computing, MOBIHOC, Aug. 11, 2000, pp. 145-146, XP001008894, Boston, MA, USA.

Kawaguchi et al, "Magnet: ad hoc Network System Based on Mobile Agents", Computer Communications, NL, Elsevier Science Publishers BV, Amsterdam, vol. 23, No. 8, Apr. 2000,3 pp. 761-768, XP004192596.

(Continued)

*Primary Examiner* — Alvin Zhu
(74) *Attorney, Agent, or Firm* — Nixon & Vanderhye P.C.

(57) ABSTRACT

Communications in a network with dynamic topology is provided in which data is carried by software agents which operate autonomously and independently of global network information.

24 Claims, 8 Drawing Sheets

(56) References Cited

OTHER PUBLICATIONS

Bandyopadhyay et al, "Using Mobile Agents for Off-line Communication Among Mobile Hosts in a Large, Highly-Mobile Dynamic Networks", IEEE International Conference on Personal Wireless Communications Proceedings, Feb. 17, 1999, pp. 88-92, XP002173603.

Camara et al, "A GPS/Ant-Like Routing Algorithm for ad hoc Networks", Wireless Communications and Networking Conference, Proceedings of IEEE Conference on Wireless Communications and Networking, vol. 3, Sep. 23-28, 2000, pp. 1232-1236, XP002173604.

Bieszczad et al, "Mobile Agents for Network Management", IEEE Communications Survey, 'Online!Sep. 1998, XP002173720, retrieved from the Internet: ,url:http://citeseer.nj.nec.com/45266.html.

Broch et al, "A Performance Comparison of Multi-Hop Wireless ad hoc Network Routing Protocols", Dallas, TX, Oct. 25-30, 1998, New York, pp. 85-97, XP000850259.

Bui et al, "Randomized Adaptive Routing Based on Mobile Agents", Proceedings of the International Symposium on Parallel Architectures, Algorithms and Networks, 1999, XP000878516, p. 381.

Wong et al, "Concordia:An Infrastructure for Collaborating Mobile Agents", Mobile Agents International Workshop, Apr. 7, 1997, pp. 86-97, XP002046843.

Dalmeijer et al, "Mobile Software Agents", Computers in Industry, NL, Elsevier Science Publishers, Amsterdam, vol. 41, No. 3, May 2000, pp. 251-260, XP004194250.

Caro et al, "AntNet: Distributed Stigmergetic Control for Communications Networks", Journal of Artificial Intelligence Research 9 (1998), pp. 317-365.

Adaptinet, P2P SDK—Programmers' Guide, Version 1.0.0, Mar. 2002, http://www.adaptinet.com.

\* cited by examiner

ROUTING METHOD AND APPARATUS FOR COMMUNICATION IN DYNAMIC NETWORKS

The present application is a National Phase of International Application No. PCT/GB02/01268, filed Mar. 15, 2002, which claims benefit of European Patent Application No. 01302655.4, filed Mar. 21, 2001, the disclosures of each of which are incorporated herein by reference.

This application is the US national phase of international application PCT/GB02/01268 filed 15 Mar. 2002 which designated the U.S.

BACKGROUND

1. Technical Field

The present invention relates to a method and apparatus for communications in dynamic networks such as ad-hoc and/or parasitic networks.

2. Related Art

A definition of an ad hoc network in "Routing in Ad Hoc Networks of Mobile Hosts", D. B. Johnson, Proceedings of the Workshop on Mobile Computing Systems and Applications, pages 158-163, 1994, is "a collection of wireless mobile hosts forming a temporary network without the aid of any centralised administration or standard support services regularly available on the wide-area network to which the hosts may normally be connected". In general ad hoc networks provide robust and adaptive solutions to a variety of wireless communications-related problems. Applications may be short or long-term solutions i.e. temporary or permanent networks.

"*A survey of routing techniques for mobile communication networks*", S. Ramanathan and M. Steenstrup, ACM/Baltzer Mobile Networks and Applications, pages 89-104, 1996, discloses routing techniques specifically designed for fully mobile architecture (packet radio or ad hoc networks) in which a definition (and therefore a differentiation) is made between switches and endpoints in the network. These systems also define hierarchy of network nodes which in some cases is dynamic, whereby nodes can be assigned the function of a temporary base station. Although hierarchy is obviously an efficient way to ensure proper routing of messages throughout a network, it requires de facto that some non-local, sometimes complex information is stored in specialised nodes.

"*An Efficient Routing Protocol for Wireless Networks*", S. Murthy and J. J. Garcia-Luna-Aceves, ACM Mobile Networks and Applications Journal, Special issue on Routing in Mobile Communication Networks, Vol. 1, No. 2, 1996, discloses a routing protocol in which no differentiation between switches and endpoints is present. This protocol is potentially more resource-consuming because it requires that routing tables are constantly updated around the system.

"*Dynamic source routing in ad hoc wireless networks*" in "Mobile Computing" D. B. Johnson and D. Maltz, (T. Imielinski and H. Korth, eds), chapter 5, Kluwer Academic Press, 1996, discloses a system called DSR. DSR has routing information traveling along with data packets and uses aggressive route discovery to keep the information up to date. However, as noted in "*Ad hoc On-Demand Distance Vector (AODV) Routing*", C. E. Perkins, E. M. Royer and S. M. Das, July 2000, IETF Internet Draft (work in progress), all intermediate nodes are still required to store (and treat) routing information. Furthermore, DSR makes extensive use of flooding procedures to provide the source with an appropriate sequence of hops to the target. Although flooding speeds up the route discovery process, it is a potential cause for system breakdown due to overhead (for example when many sources are sending simultaneous requests).

BRIEF SUMMARY

According to embodiments of the present invention there is provided a method of routing a data carrier between a source node and a destination node in a network, said method comprising the steps of:

moving the carrier between nodes in accordance with pre-determined set of rules;

memorising a route between a source node and a destination node; and identify other such carriers and on such detection to optimise memorised paths with the or each other carrier.

The packets or agents in embodiments of the present invention use a combination of random exploration pattern, individual memory, and in its co-operative version, sharing of information between individual packets or agents. Unlike other routing protocols designed to support ad hoc networks, the present invention requires no table to be stored in nodes themselves, except for a list of directly accessible (adjacent) neighbours. Instead, agents carry messages and use their own memory of past successful attempts as a navigation tool. Consequently, real-time updates of routing tables (as usually required by continuous changes in network topology) is unnecessary thereby saving network node resources.

In other words, the system does not store routing information in nodes themselves, but in the agent in charge of delivering the message. Since this agent continues moving back and forth between the source and the target, the sequence of hops is updated automatically and only when necessary such as when a shortcut becomes available or a relaying node has moved out of range. As a result, nodes of the route that are not currently handling the message have none of their resources mobilised by the agent, and are indeed "unaware" of their relay status.

In summary, the advantages of embodiments of the present invention over known protocols is that it is designed with decentralised dynamic networks in mind. Therefore, it is independent of the system's architecture and subsequently unaffected by any instability in that architecture. Furthermore, embodiments of the present invention do not consist of adapted known routing tables techniques to a dynamic environment by the introduction of more complex updating procedures or hierarchies. The navigation concept of embodiments of the present invention relies on the agents' "successful route" memory rather than on any node-based network map.

In particular circumstances, further advantages of the present invention may be realised. For example, the "giving-up" rule that the agents of the present invention use when a destination node cannot be found ensures that the agent will not remain trapped when it has made a wrong choice in a search attempt. Furthermore, the detection of a broken link in the trail, resulting in a search for an alternative route, may discover a better solution by a "trial and error" learning process.

BRIEF DESCRIPTION OF THE DRAWINGS

Embodiments of the present invention will now be described by way of example with reference to the accompanying drawings in which.

DETAILED DESCRIPTION OF EXEMPLARY EMBODIMENTS

Dynamic network protocols have many applications some of which are short term and others more permanent. Short term networks might be deployed in a situation where a "high-tech" team (requiring reliable information exchange between sub-units) is deployed in a "low-tech" environment (featuring insufficient telecom infrastructure). Examples are:
- Scientific expeditions or natural resources survey in vast unpopulated areas;
- Humanitarian operations in third-world countries;
- "Search and rescue" missions when natural catastrophe has disabled normal communications or in remote areas; and
- Military operations.

More permanent applications of such networks may be deployed where the rapid development of integrated information technology requires devices such as computers, mobile phones, mobile hardware agents need-to be able to interact on a permanent basis and without human intervention. The "Bluetooth" architecture (J. Haartsen, M. Naghshineh, J. Inouye, O. J. Joeressen, and W. Allen, *"Bluetooth: Vision, Goals, and Architecture"*, Mobile Computing and Communications Review 2(4), pages 38-45, 1998) is already working on this hypothesis. In such integrated systems, hierarchical management of information transfer is likely to be impractical, because the system dynamics are too complex for centralised planning to be conducted in real time.

Figure 1:
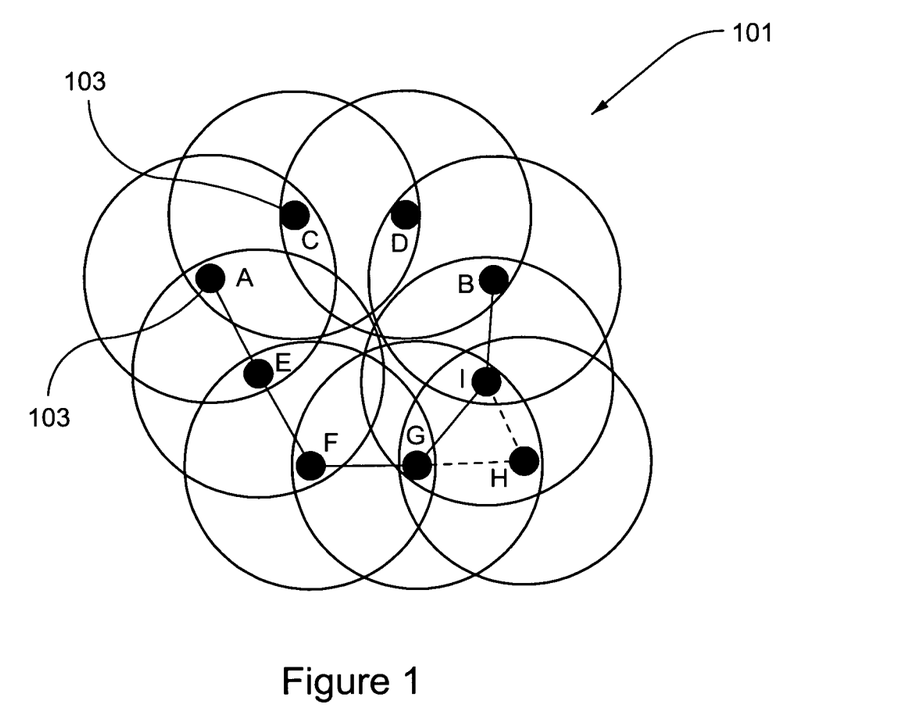
FIG. 1 is a schematic representation of nodes in a network.

FIG. 1 is a schematic representation of a network 101 comprising a number of nodes 103. Each node is able to participate in the network by being able to create and host one or more software agents (not shown in FIG. 1). Furthermore, each agent has a limited range (indicated by the grey circles in FIG. 1) over which it can communicate with other nodes 103 in the network 101 and each node 103 is mobile. Over time nodes will move relative to each other resulting in a given node moving in to and out of range with other nodes 103 in the network 101. In other words, the topology (connection pattern) of the network 101 is dynamic.

Software agents (i.e., data carriers or agent logic structures) are the means used by the network 101 to carry communications and data between the nodes 103 of the network. In general, software agents are programs which can move between hosts as part of their operation. This is dependent on each host having an appropriate environment for the agent to run in. As with any software, agents exhibit predetermined behaviour which in the present embodiment enables an agent to carry data from a source node 103 in the network 101 to any of the other nodes 103 in the network which is the destination of that data. The agents thereby provide communications in the network 101.

The behaviour of the agents in the network 101 is determined by the agent protocol. The protocol operates using local information only (no global map of the network or higher-level directives are available). The protocol also has the following properties:
- it takes in to account the local environment of the agent (namely which nodes are currently within range);
- it takes in to account the past experience of the agent to improve its chances of reaching its target;
- it is robust and capable of dealing with "missing" relays by searching for alternative solutions;
- it is able to identify available shortcuts and discarding unnecessary relays; and
- it is as simple and lightweight as possible so that the "navigation" algorithm and accompanying resources can travel along with the message without reducing mobility.

The agents of the present embodiment have a memory which is used to record the path used to move from the source node to the destination node in the network. This path memory is then used in subsequent movements by the agent, marking pathways that have already been used, and establishing shortcuts between physically close locations, even when the original path between them involved a long detour. This path memory also act as an implicit record of changes in the network's topology, since a connection in the path memory linking once close nodes will obviously break if the nodes move too far apart i.e. out of transmission distance.

Figure 2A:
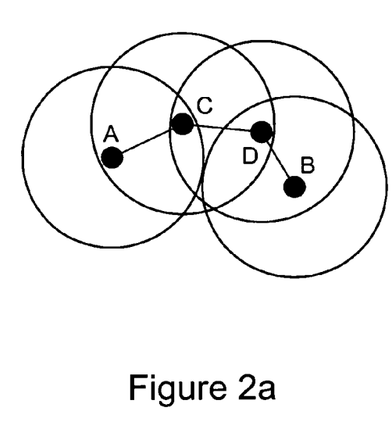
FIG. 2a and FIG. 2b are schematic representations of nodes in a network illustrating the dynamic nature of the network topology.
Figure 2B:
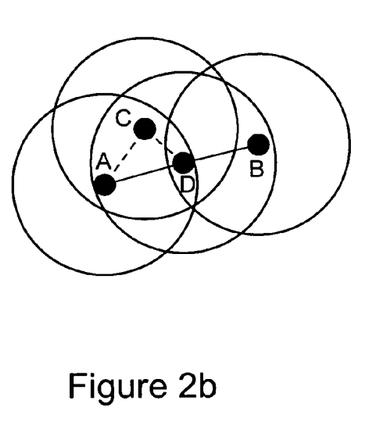

The FIGS. 2a and 2b show how an agent would deal with a dynamic situation. In order to travel from A to B, given range limitations (grey area), the only way is initially (as shown in FIG. 2a) through C and D. Due to nodes' displacements, D moves within range of A. C is dropped from the route (as shown in FIG. 2b) and only one relay is maintained (D).

This is a trivial procedure if the agent had the complete connection matrix of the network. Set out below are a pair of connection matrices representing the network connections illustrated in FIGS. 2a & 2b respectively.

|   | A | B | C | D |
|---|---|---|---|---|
| A | 1 | 0 | 1 | 0 |
| B | 0 | 1 | 0 | 1 |
| C | 1 | 0 | 1 | 1 |
| D | 0 | 1 | 1 | 1 |

|   | A | B | C | D |
|---|---|---|---|---|
| A | 1 | 0 | 1 | 1 |
| B | 0 | 1 | 0 | 1 |
| C | 1 | 0 | 1 | 1 |
| D | 1 | 1 | 1 | 1 |

However, the agents of the present embodiment are only aware of the "A" row i.e. only the other nodes that are within range of the network node at which the agent is located. However, from the path memory, the agent "knows" that on a previous trip from A to B, D was closer to the target than C. Assuming that the nodes B and D are within range of each other, the agent is designed to move directly from A to the newly accessible D, which in this example proves to be a successful move.

However, if B had moved simultaneously away from D and closer to C (a possible case that the agent has no way to anticipate since it isn't affecting the "A" row), the new connection matrix could have read:

|   | A | B | C | D |
|---|---|---|---|---|
| A | 1 | 0 | 1 | 1 |
| B | 0 | 1 | 1 | 0 |
| C | 1 | 1 | 1 | 1 |
| D | 1 | 0 | 1 | 1 | and moving directly from A to D would have been an error. The protocol is designed to take this risk. However as shown below in the test results section, this strategy performs well in complex network configurations.

When an agent has no record of a previously successful route to a destination node in the path memory, for example on a first attempt to reach the intended target node, then the agent begins a search procedure. In the present embodiment, this is a random walk pattern which is carried out according to the following two rules:

Rule 1: avoid returning back along the current path;
Rule 2: if the target is not reached within a predetermined number of moves then fail.

When an agent is successful in reaching a destination node, it delivers the information it is carrying, memorises the successful path in the path memory and attempts to come home along the same path carrying an "acknowledgement" message (updating the path in the path memory if local shortcuts are detected.) If the agent fails to reach it destination node then it self-terminates. The sender node may be arranged to create a new agent message after a critical delay (assimilated to a failure) has elapsed.

Whenever an agent cannot access the next node along its intended path, it immediately reverts to random search for a possible route, but still retains the ability to come back on trail if the opportunity arises. In other words, if an agent is forced to temporarily leave a memorised path, but later comes in contact with another section of that path, it will resume the memorised path.

An optional feature for the above embodiment allows agents to exchange information when they emanate from the same node. When two such agents detect each other i.e. are on the same node, they compare path memories. If they each have a path for the same destination then the agent with then longest (worst) path in its path memory overwrites it with the shorter path from the other agents memory. The agents can exchange information when travelling in opposite directions, by using "mirror" images of their path records. A further optional feature may allow agents from different nodes or perhaps a selected set of nodes to exchange information in this way.

A further optional feature extends the path swapping feature noted above in order to improve the collective efficiency of all the agent emanating from a given node or set of nodes. This is enabled by providing an agent that is kept resident on the sender node and which is arranged to centralise information carried by all the mobile agents coming back with acknowledgement messages. The resident agent acts as the collective memory of the colony, suitably located on the one node that is, by definition, part of all trajectories. The resident agent has a path memory and is arranged to inspect the path memories of each returning agent. If any path for a given destination in the memory of a returning agent is better (shorter) than that for the same destination in the memory of the resident agent, the resident agent stores the better path for that destination in its memory instead. Then, whenever a mobile agent is sent to a destination, the path memory of the resident agent is consulted for a best path to that destination.

Figure 3:
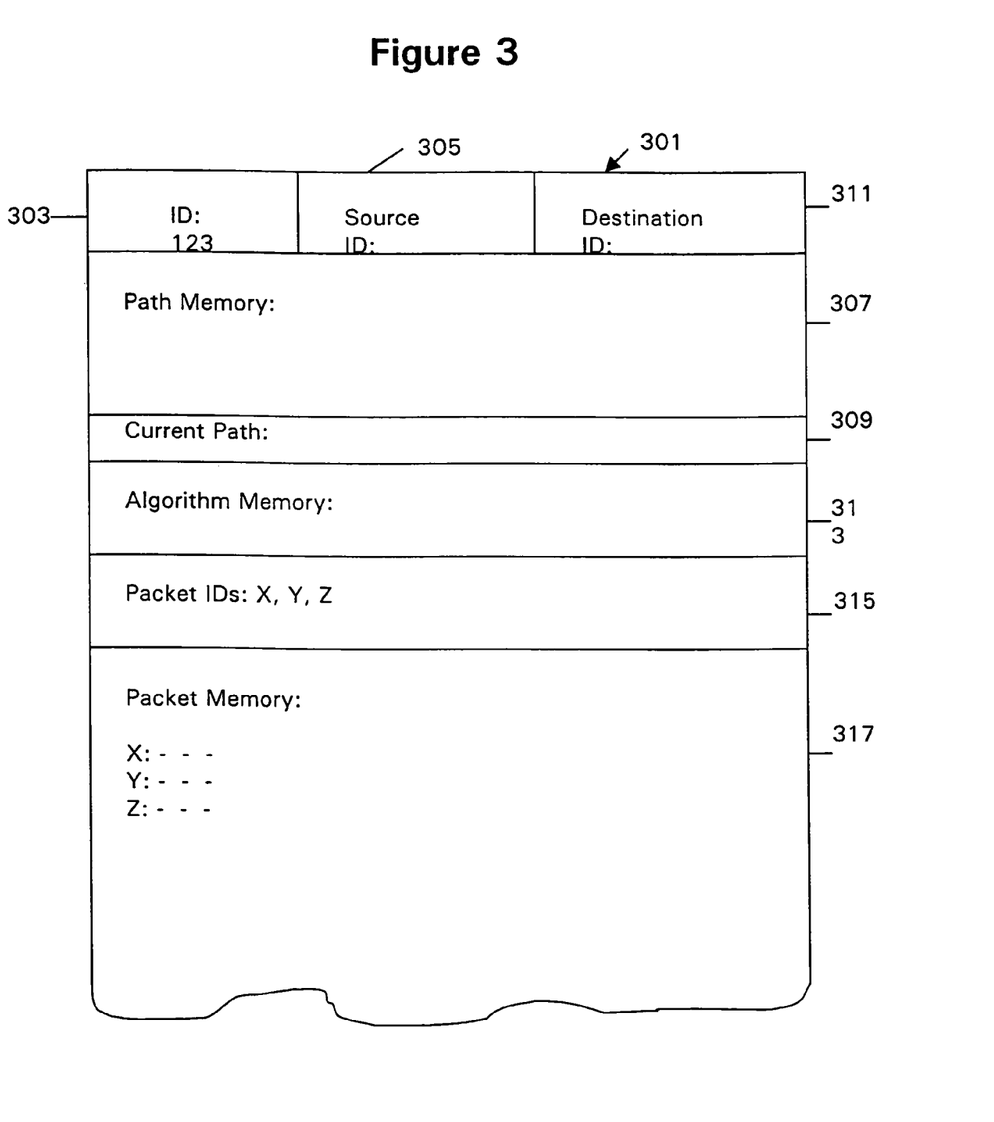
FIG. 3 is a diagrammatic representation of a software agent according to an embodiment of the present invention.

The structure of each mobile agent will now be described in further detail with reference to FIG. 3. Each agent 301 has a unique identification number (ID) and an indication 305 of the source node from which the agent emanates. The ID 303 and the source identifier 305 are used by agents to verify their identities when the protocol is operating in one of the cooperative modes. The agent 301 also comprises a path memory 307 for storing paths to one or more destination nodes. The agent 301 also comprises a current path memory 309 which is used to keep a record of the path that the agent 301 is currently following to its destination. The destination of the agent 301 is recorded in the destination identifier 311. The agent 301 also includes an algorithm memory 313 used to store the instructions that define the agent's behaviour which will be described in further detail with reference to FIGS. 4 and 5 below. The agent 301 also has a packet identifier 315 which identifies the packets that are being carried by the agent 301 and which are stored in a packet memory 317.

Figure 4:
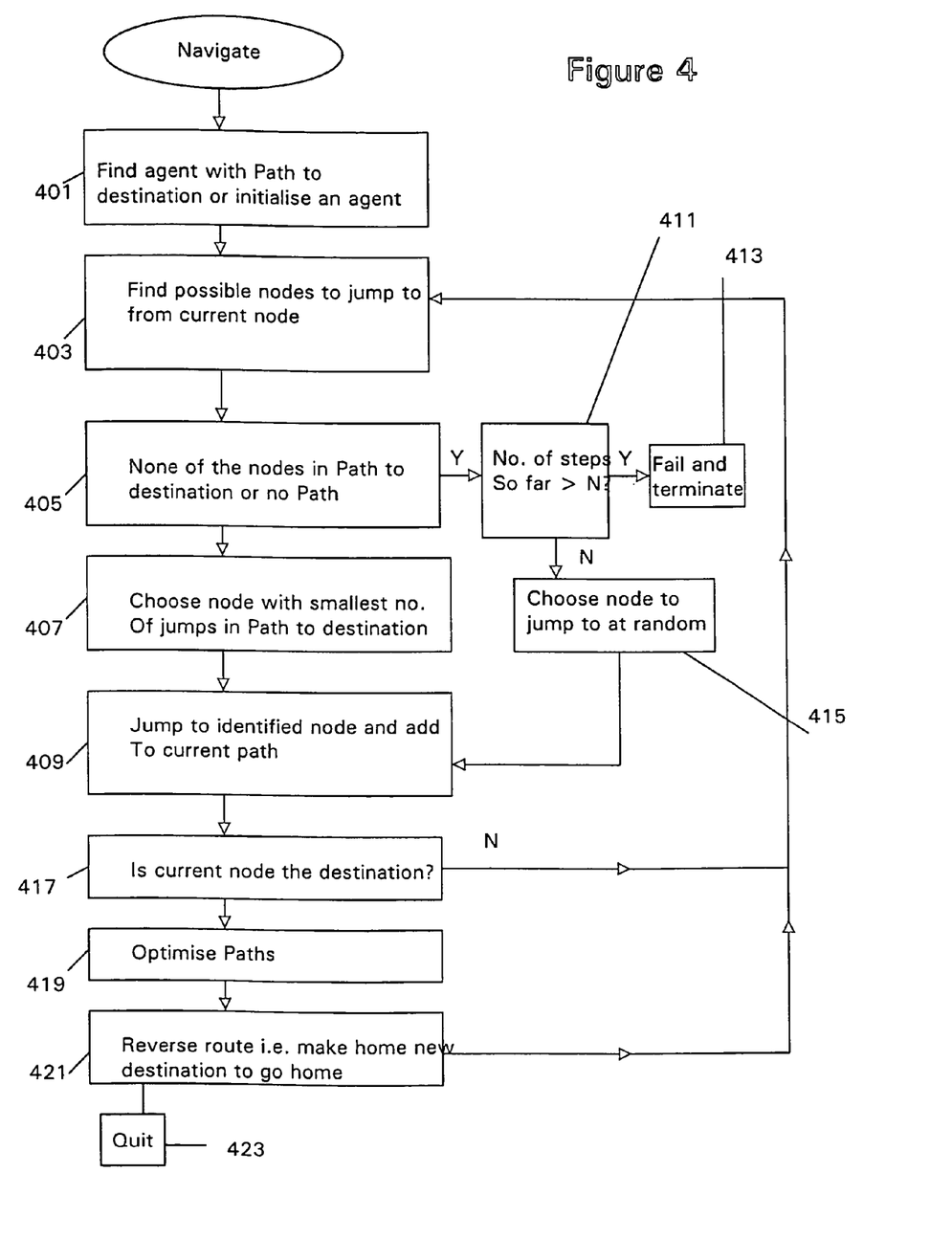
FIGS. 4 and 5 are flow charts illustrating the behaviour of the agent illustrated in FIG. 3.

The navigation behaviour of the agent 301 will now be described further with reference to the flow chart in FIG. 4. When a node needs to communicate with another node then, at step 401 the node identifies one of its resident agents that has a path or part of a path in its path memory 307 that includes the destination node. Failing this the node initialises a new agent. The agent is then initialised and loaded with its payload of data packets and their identifiers. At step 403 the agent identifies all of the nodes within range of its home node i.e. the nodes that it could jump to. At step 405 the agent determines whether any of the nodes that it identified in step 403 occur in the path to its destination (held in the path memory 307). If one or more of the nodes occur in the path then processing moves to step 407 at which the node which has the smallest number of jumps between it and the destination in accordance with the path from the path memory 307 is selected and processing moves to step 409.

If at step 405 none of the nodes identified in step 403 are in the path of the path memory 307 or no path has been selected since the agent is a newly initialised node (in step 401) then processing moves to step 411. At step 411 a check is made to determine whether or not the number of steps made so far by the agent exceeds the step threshold N. If this is the case then at step 413 the agent self-terminates and the communication has failed. If the number of steps is fewer than the threshold N then processing moves to step 415 at which a node from the nodes identified in step 403 is chosen at random (excluding the previously visited node) and processing moves to step 409.

At step 409 the agent jumps to the identified node and adds an indication of that jump to the current path memory 309. The agent also stores an indication of its current location in the path from the path memory that it is currently following. Processing then moves to step 417 in which the agent checks whether the current node is its destination node 311. If this is not the case then processing moves back to step 403 where the agent looks to jump to the next node in the path that it is following.

If at step 417 the current node is then destination 311 then at step 419 the agent carries out an optimisation process. This process compares the path in the current path memory 309 with the path from the path memory 307 that was being followed. If the path in the current path memory 309 is shorter than the path being followed then the shorter path replaces the path being followed in the path memory 307. Processing then moves to step 421 in which the agent reverses the path in the path memory that it used to reach the destination node and delivers its data 317 to the destination node. The processing then returns to step 403 to enable the agent to return to its source node using the reversed path. If, step 421 is reached by an agent reaching home then rather than delivering its data packets 317 it provides the node with a successful delivery indicator (or acknowledgement signal—described further below).

On the agent's trip home, processing may move to step 417 when the destination (the home or source node) is reached. Processing then moves to step 419 where the agent will optimise the paths in its path memory 307 against the path taken 309 as noted above. Processing will then move to step 421 as noted above where, if the current node is the home node, the agent will quit.

As noted above the agents can operate in non-cooperative or cooperative modes. When operating in a cooperative mode, the agents carry out further processing which will now be described with reference to FIG. 5. When a cooperating agent arrives at a network node it attempts to identify other agents on the same node at step 501. If no other agents are identified then the cooperation processing ends at step 503. However, if one or more other agents are identified then at step 505 the agent attempts to identify whether the or each other agent is from the same source node. If this is the case then processing moves to step 507. If the agent is not at its source node then the or each other agent that it has identified must be sister agents and therefore processing moves to step 509 where the relative directions of travels of the agents is identified and processing moves to step 511.

Figure 5:
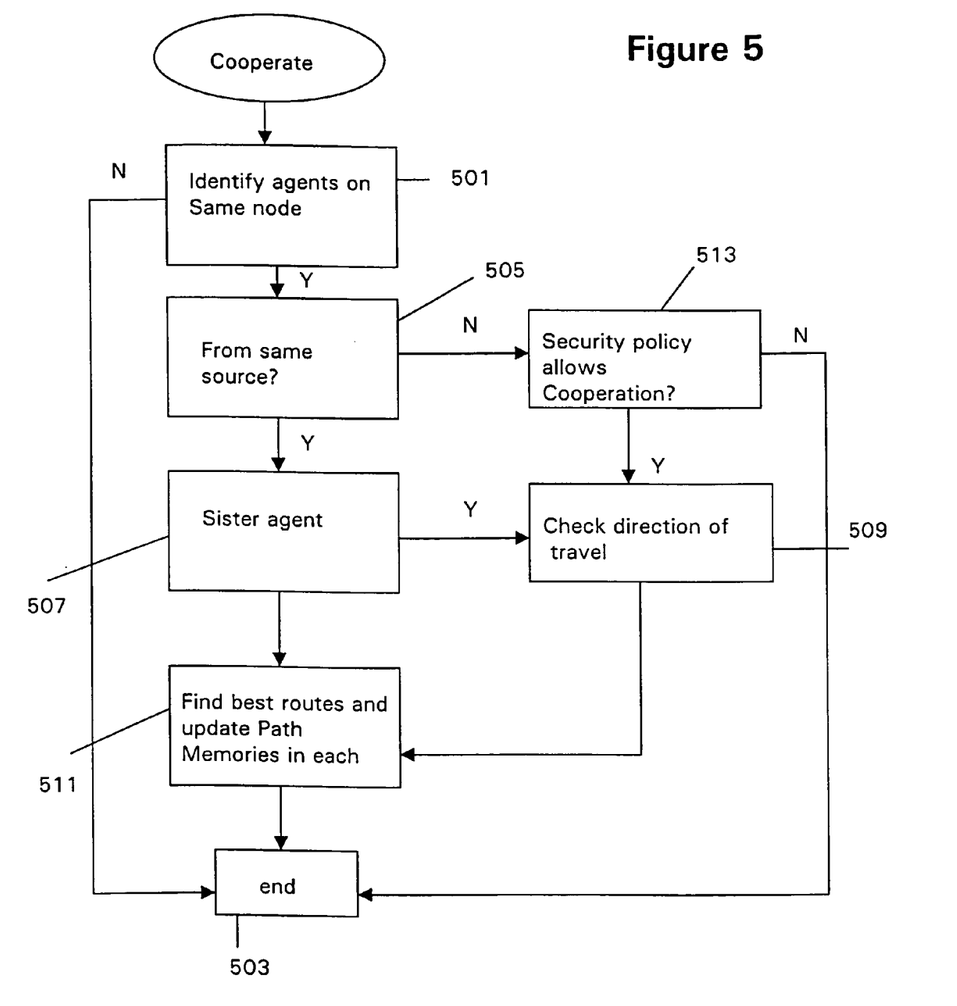

If at step 507 the agent is at its home node then the other agents that is identified must be the resident agent for that node and processing moves to step 511. Step 511 can be reached either from step 507 when an agent has arrived at its home node or from step 509 where two agents from the same source (home node) have coincided on another node elsewhere in the network. At step 511 the agents compare the routes stored in the current paths 309 and path memories 307 and replace the less good (longer) route with the best (shortest) route in the memories of each. It will be understood that in carrying out this comparison process the direction of travel of agents meeting on nodes other than their home node will be taken in to account. Processing then moves to step 503 where the cooperative behaviour of the agents ends.

If, at step 505 one or more of the or each other agents identified on the node are not from the same source node as the cooperating node then processing moves to step 513. At step 513 the cooperating agent establishes uses a security policy to determine which if any of the other agents it can cooperate with. If it can cooperate with none of the other agents then processing moves to step 503 and the cooperation process ends. However, if the cooperating agent is allowed, according to the security policy, to cooperate with one or more of the other agents then processing moves to step 509 (but only for the nodes with which cooperation is permitted).

It should be noted that the step 513 described above with reference to FIG. 5 is an optional feature and that the cooperation process outlined in FIG. 5 could be designed to only allow sister or sister and resident agents to cooperate. Similarly the cooperation process could be designed to allow an agent only to cooperate with another sister agent or only to cooperate with its resident (home) agent.

The path memory 307 could either be used to store more than one path or a number of paths depending on the memory requirements of the agent. In other words memory could be saved by storing only one previous path in the path memory 307. It would also be understood that a path to a destination node via a plurality of intermediate nodes can also be used as a path to each of the intermediate nodes themselves.

The optimisation process (see step 419 of FIG. 4) can be carried our either on the agent reaching its destination node or only on the agent reaching its source (home) node. Alternatively this optimisation step could be carried out when the agent reaches its destination node and when it reaches its source (home) node.

Although in the processing described with reference to FIG. 4 above, when the agent has reached its destination node, instead of optimising the path it has taken to reach that destination against the path memory, an attempt could be made to follow the original path on the path memory back to the home node. Once home the agent could carry out the optimisation process between the outward path, the homeward path and the original path on the path memories 307.

The data carried by the agent, probably in packets, can travel separately from the agent, with the agent waiting at each node to collect its payload. Alternatively the agent and data can be combined into one entity.

As it will be understood by those skilled in the art, the destination ID 311 need not be stored since the same information can be found by inspecting the end node in the path from the path memory 307 that was being followed.

The performance of the embodiments of the invention has been tested using Monte Carlo simulations, with a simulated network comprised of 50 nodes evolving in a fixed scale environment. To solve the variability problem associated with cumulative stochastic effects i.e. "Brownian" movement of nodes and probabilistic exploration pattern, a sample of randomly generated initial conditions, combined with deterministic rules for node movement, was used to conduct all numerical experiments. In other words all simulations involved several versions of the agent protocol as well as an ideal link-state (ILS) protocol (which is described in further detail below). These simulations were run in the same dynamic environment with an identical network history.

In order to avoid the case in which emitter and receiver network nodes are in immediate contact (a situation where all routing protocols are equivalent, making comparison impractical), the endpoints were assumed to be immobile and placed in selected locations. These were 4.8, 3.2 and 1.6 communication radius apart and termed long, medium, and short-range experimental sets respectively. The agents were given 48 potential mobile nodes across which to connect the two fixed endpoints (nodes). These restrictions were imposed to the test environment only to make statistical treatment possible and do not imply any inherent limitation on the protocol which is capable of dealing with a fully dynamic stochastic network.

Figure 6:
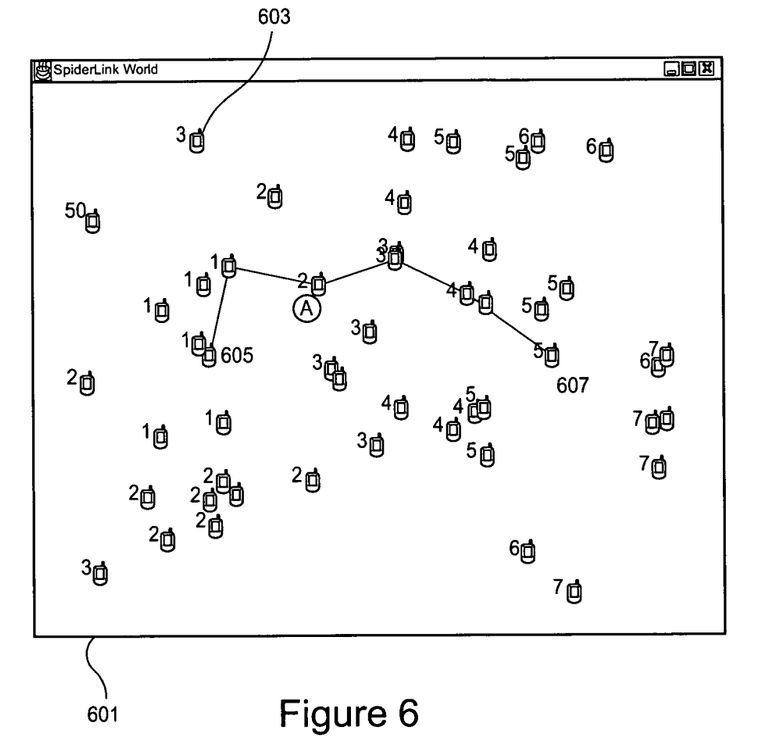
FIG. 6 is a schematic representation of nodes in a network illustrating a simulation and test environment for software agents.

The simulated environment is illustrated in FIG. 6 and comprises a rectangle 601 representing a network area of 6.4 by 4.8 communication radius. Forty eight mobile nodes 603 were moving along diagonal trajectories, "bouncing" on the rectangle's 601 boundaries. Light grey lines connect the mobile nodes 603 that are within each other's communication radius. Black lines are the "internal representation" (path memory) that an agent A has of its environment (last recorded successful sequence of hops).

The time delay between the departure of a given agent carrying a message (packet) from an emitter node 605 and its successful return from the receiver node 607 with the corresponding acknowledgement (ACK) was recorded. If the agent fails to deliver ACK within $N_c$ (in this test c=32) time steps the agent self-terminates and is re-instantiated by the emitter 605. In the simulations, there is one hop per time step. The total delay can be the sum of several unsuccessful attempts plus one successful delivery (and resulting ACK). Since the emitter 605 has no way of knowing whether the agent failed in reaching the receiver 607 or only in bringing back the acknowledgement message, a packet may be sent again by the emitter 605 even though it has already been received by the receiver 607.

The ideal link-state (ILS) algorithm noted above is based on the assumption that each node 603 is kept informed in real-time of the number of hops between each of its immediate neighbours 603 and both the emitter 605 and the receiver 607. Depending on whether the agent is carrying a data packet or an acknowledgement message, the agent selects the next node 603 on its path by choosing the one with the lowest number of hops to its current destination (receiver 605 or emitter 607). Conflicts are resolved in favour of the node 603 with the lowest ID number 303. Propagation of the routing information to the nodes 603 is taken care of by a flooding procedure, initiated from both the emitter 605 and receiver 607 at each time step. The emitter to receiver element of the routing information is indicated in FIG. 6 by the numbers associated with each node 603. The receiver to emitter element of the routing information is not shown for the sake of clarity.

This flooding procedure is unrealistic in practice and would require faultless communication throughout the network 601 and considerable amount of resources. The flooding procedure ensures that agents' decisions are locally optimised with respect to the current network topology. Accordingly, ILS can be regarded as a limit case toward which all routing algorithms should tend, unless a reliance on more complex distance-vector procedures is made (these involve projection of future network's state from node trajectories and are very computationally costly)

Each simulation involved groups of 8 agents which are either performing in a non cooperative or exchanging information by cooperating with the other agents. In the cooperative scenario, a ninth resident agent is created as described above. Five simulations were performed for each of a set of initial conditions and for each agent version (cooperative and non-cooperative). As a precaution against a potential bias induced by a peculiar network history, two different samples were generated for each (short, medium and long) range. The simulation was halted-when 100 ACKs had been received from the first agent. Since the ILS algorithm is deterministic, its performance can be computed after only one run for each set of initial conditions.

The ratio between node movement speed and communication speed is an important parameter because it determines the average rate at which changes in network topology affect routing procedures. In order to test the influence of node speed, every sample was tested with nodes moving at 0.01 (fast) and 0.00125 (slow) communication radius per time step (or hop).

Figure 7A:
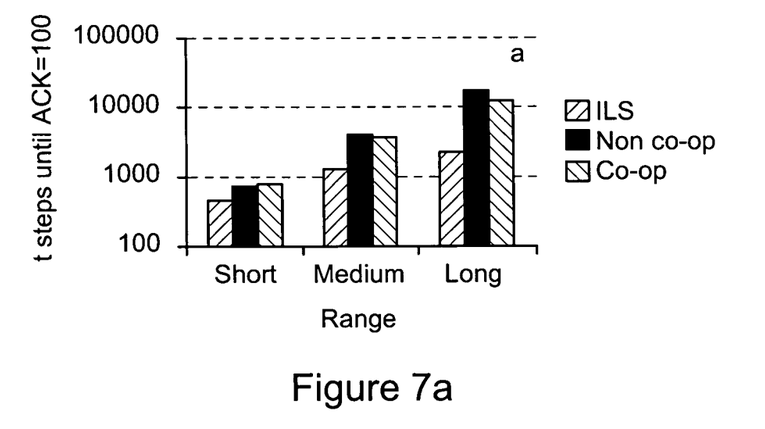
FIGS. 7a and 7b and FIGS. 8a and 8b are graphs showing the performance of agents in the simulation environment of FIG. 6.
Figure 7B:
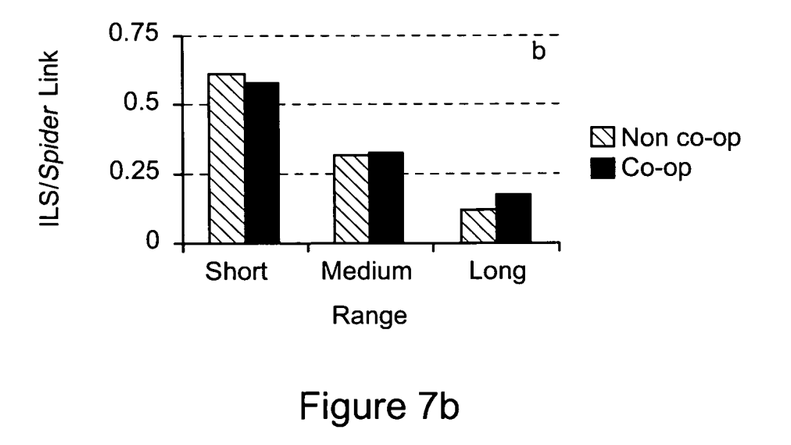

FIGS. 4a and 4b give a graphical summary for the "fast moving relays" scenario. FIG. 7a shows the average number of time steps required to reach a total of 100 ACKs from the first agent and FIG. 7b gives a relative measure of efficiency for the non co-operative and co-operative versions relative to the ILS algorithm. Table 1 shows the average number of time steps required to reach a total of 100 ACKs by the first agent in the "fast moving relays" scenario. It can be seen that the protocol's performance is extremely sensitive to the distance between endpoints (transmitter 605 and receive 607), dropping dramatically as it increases. Indeed, for short-range samples, it is on average over 50% as efficient as ILS, while this figure drops to slightly more than 10% for long-range. This can be explained by considering the fact that broken links are more frequent when communication lines are extended (many hops), and unlike ILS, the present agent protocol has to actively explore the network 601 to find another route whenever a particular node 603 has moved out of range.

It can also be seen from FIG. 7b and table 1 that the relative performance of non co-operative and co-operative versions reverses as distance increases. At short range, sharing routing information appears to be detrimental to performance. This may be explained by the fact that broadcasting correct but sub-optimal solutions prevents agents from looking for better ones. On the contrary, at long range, co-operation somewhat limits the drop of efficiency. This may be explained by the fact that because correct routes are more difficult to find, there is actually an advantage in sharing even sub-optimal ones.

TABLE 1

| | Short range | | Medium Range | | Long Range | |
|---|---|---|---|---|---|---|
| | sample 1 | sample 2 | sample 1 | sample 2 | sample 1 | sample 2 |
| ILS | 456 | 495 | 1532 | 1233 | 2438 | 2348 |
| Non co-op. | 712 | 828 | 4838 | 3893 | 16690 | 22251 |
| Co-op. | 762 | 861 | 4693 | 3586 | 12289 | 14933 |

Figure 8A:
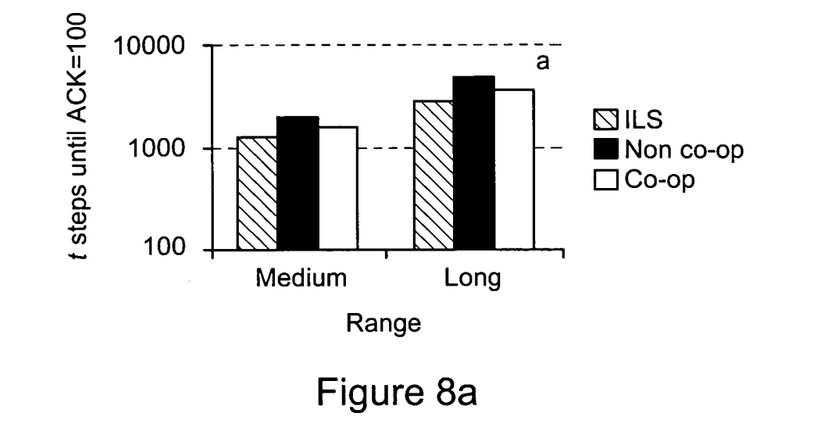
Figure 8B:
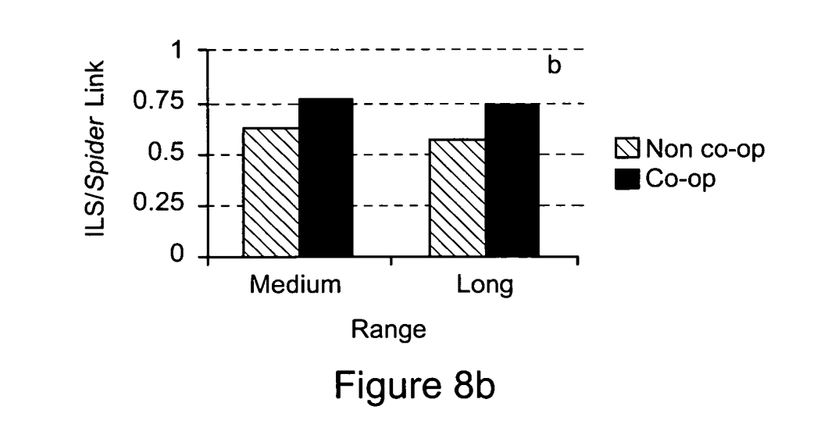

FIGS. 8a and 8b give a graphical summary for the "slow moving relays" scenario. FIG. 8a shows the average number of time steps required to reach a total of 100 ACKs from the first agent and FIG. 8b gives a relative measure of efficiency for the non co-operative and co-operative versions relative to the ILS algorithm. Table 2 shows the average number of time steps required to reach a total of 100 ACKs by the first agent in the "slow moving relays" scenario. It can be seen that when relays are moving slowly (compared to agents), performance of protocol actually comes remarkably close to that of the ILS algorithm, especially when routing information is shared (co-operative version). Even with endpoints 4.8 communication radius apart (long-range), average efficiency remains above 70% of ILS. More importantly, the drop of relative performance between medium and long-range samples is negligible, although the average number of relays (route length) is obviously higher. This supports scalability the scalability of the protocol.

TABLE 2

| | Medium Range | | Long Range | |
|---|---|---|---|---|
| | sample 1 | sample 2 | sample 1 | sample 2 |
| ILS | 1686 | 955 | 3227 | 2880 |
| Non co-op. | 2311 | 1808 | 4668 | 5744 |
| Co-op. | 2135 | 1246 | 3906 | 4188 |

Given the relative speed of electromagnetic signals and physical devices, the "slow moving relays" scenario is much closer to reality than its counterpart. Even taking into account computational delays inherent to the routing procedure itself (which of course typically exceeds signal propagation time by several orders of magnitude), network topology is usually fairly stable for the duration of the average data transmission. For example, assuming a communication radius of 1000 m and a transmission rate of 10 hops per second, "slow moving" nodes would still be travelling at 12.5 m/s, i.e. 45 km/h.

In the above embodiment(s) information transfer efficiency is improved by looking for the shortest route between the emitter and the receiver. As an alternative, other parameters such as queuing and buffering delays, related to the local workload of intermediate nodes, may lead to more efficient routing and so be taken into account when the agent considers which node to move to next. An "attractiveness" measure for each node could be provided based on the node's current workload. This information could be broadcasted by all nodes, for example as part of the beacon signal that keeps neighbouring nodes aware of a node's presence.

It may be the case in some applications that the efficiency of the protocol is of particular importance. In these circumstances it may be desirable to ensure that the cost of the circulation of the agents themselves is balanced against that of the information they deliver. To address this, the protocol could be modified so that an agent would not make an attempt to deliver information packets unless it had above a threshold number of packets to deliver. The threshold might be variable in response to prevailing network conditions e.g. traffic volumes or congestion.

Some further notable features of embodiments of the present invention are now described below. The protocol is lightweight i.e. in its current state, in a N nodes network, it only requires a maximum of:

$$x = \frac{2N_c \ln(N)}{\ln(2)} \text{ bits}$$

of information to keep a record of its last successful and current attempt, which in the simulation environment noted above, (N=50, $N_c$="give up" path length=32) is <50 bytes. Furthermore, the protocol is robust since its purpose is to deal with a dynamic network where, by definition, a once available relay can be missing in a later attempt, the protocol is intrinsically resistant to node failures. To the protocol there is no difference between a relay that has changed location and one that has ceased to function. Both nodes simply do not show up on the list of locally accessible nodes.

The protocol also has a number of inherent security features, for the following reasons:
1) The path followed by the information is unpredictable and highly dynamic making eavesdropping impractical;
2) Nodes are only aware of their nearest neighbours so "hijacking" a node would not reveal much of the network's structure; and/or
3) Ad hoc networks in general are designed to support long range information exchange through short range communication, meaning a series of low power and so less vulnerable emissions can be used to carry a message over long distances.

It will be understood by those skilled in the art that the apparatus that embodies the invention could be a general purpose device having software arranged to provide the an embodiment of the invention. The device could be a single device or a group of devices and the software could be a single program or a set of programs. Furthermore, any or all of the software used to implement the invention can be contained on various transmission and/or storage mediums such as a floppy disc, CD-ROM, or magnetic tape so that the program can be loaded onto one or more general purpose devices or could be downloaded over a network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A method of routing a mobile software agent between a source node and a destination node in a network, said method comprising:
    causing the mobile software agent to move back and forth between the source node and the destination node via intermediate nodes in accordance with a predetermined set of rules;
    causing the mobile software agent to memorize a route between the source node and the destination node; and
    identifying other such mobile software agents when such mobile software agents are on the same intermediate node at the same time;
    wherein upon another such mobile software agent being identified, the thus identified mobile software agents exchange information with each other to optimize paths memorized by said mobile software agents.

2. A method according to claim 1, further comprising associating data with the mobile software agent so as to transport the data between network nodes under control of the mobile software agent.

3. A method according to claim 2 in which the mobile software agent is caused to follow a previously memorized path between a source node and a destination node.

4. A method according to claim 3 in which the mobile software agent causes the further step of initiating a search for an alternative path when a move between nodes of a memorized path is not possible.

5. A method according to claim 4 in which the mobile software agent resumes a memorized path when it is coincident with an alternative path.

6. A method according to claim 5 in which the mobile software agent causes further steps of comparing a memorized path with the alternative path and memorizing the shortest of the paths in response to reaching a destination node.

7. A method according to claim 3 in which the mobile software agent causes the step of determining an optimal route from a plurality of possible routes.

8. A method according to claim 1 in which the mobile software agent causes the further step of returning to the source node when the destination node has been reached.

9. A method according to claim 1 in which the mobile software agent causes the further step of identifying other such software mobile agents and on such identification optimizes memorized paths with at least one of said other software mobile agents.

10. A method according to claim 9, in which the optimization is carried out using a non-mobile software entity that is resident on the source node.

11. A method according to claim 9 in which the optimization comprises memorization of the shortest path from each of the mobile software agents.

12. A method according to claim 1 wherein said route comprises a sequence of hops between said source node and said destination node.

13. A communication network of plural mobile nodes wirelessly communicating with each other and including respective processors which host mobile software agents configured to move between a source node and a destination node in said network, said mobile software agents each comprising a computer software object including computer program code embodied in a non-transitory computer-readable medium accessible to a processor and which, when executed, is operable to:
    cause the mobile software agent to move back and forth between the source node and the destination node via intermediate nodes in accordance with a predetermined set of rules; and
    cause the mobile software agent to memorize a route between a source node and a destination node; and
    cause the mobile software agent to identify other such mobile agents when such mobile software agents are present at the same intermediate node at the same time;
    wherein upon another such mobile software agent being identified, the mobile software agents exchange information with each other to optimize paths memorized by said mobile software agents.

14. A communication network according to claim 13, wherein said mobile software agents further comprise data transport means arranged to enable data to be associated with the mobile software agent and to be transported between network nodes under control of the mobile software agent.

15. A communication network according to claim 13, in which the instruction means is operable to cause the mobile software agent to follow a previously memorized path between a source node and a destination node.

16. A communication network according to claim 15, in which the instruction means is operable, in the event that a move between nodes of a memorized path is not possible to initiate a search for an alternative path.

17. A communication network according to claim 16, in which the instruction means is operable to resume the memorized path when it is coincident with the alternative path.

18. A communication network according to claim 17, in which the instruction means is operable when the mobile software agent reaches the destination node to compare the memorized path with the alternative path and to memorize the shortest of the paths.

19. A communication network according to claim 15, in which the instruction means is operable to determine an optimal route from a plurality of possible routes.

20. A communication network according to claim 13, in which the instruction means is operable to cause the mobile software agent to return to the source node when the destination node has been reached.

21. A communication network according to claim 20, in which the instruction means is operable, on reaching the source node to cause the entity to optimize memorized paths with other such mobile software agents present on the source node.

22. A communication network according to claim 21, in which the optimization is carried out using a non-mobile software agent that is resident on the source node.

23. A communication network according to claim 22, in which the optimization comprises memorization of the shortest path from each of the mobile software agents.

24. A communication network according to claim 13 wherein said route comprises a sequence of hops between said source node and said destination node.

* * * * *